US012703581B2

(12) United States Patent
Murray et al.

(10) Patent No.: US 12,703,581 B2
(45) Date of Patent: Aug. 11, 2026

(54) COMPACT NON-PNEUMATIC JUSTIFICATION SYSTEM

(71) Applicant: Google LLC, Mountain View, CA (US)

(72) Inventors: James Murray, Mukilteo, WA (US); Nathanael Arling Worden, Mill Creek, WA (US); Rachel Soukup, Seattle, WA (US); Samuel Gardner Garrett, Seattle, WA (US); Adam Clark, Marysville, WA (US)

(73) Assignee: Google LLC, Mountain View, CA (US)

( * ) Notice: Subject to any disclaimer, the term of this patent is extended or adjusted under 35 U.S.C. 154(b) by 74 days.

(21) Appl. No.: 18/772,467

(22) Filed: Jul. 15, 2024

(65) Prior Publication Data

US 2026/0015184 A1 Jan. 15, 2026

(51) Int. Cl.
*B65G 47/82* (2006.01)

(52) U.S. Cl.
CPC .................................... *B65G 47/82* (2013.01)

(58) Field of Classification Search
CPC ...................................................... B65G 47/82
USPC .................................................... 198/370.07
See application file for complete search history.

(56) References Cited

U.S. PATENT DOCUMENTS 1,476,737 A * 12/1923 Strout ..................... B65B 57/04 198/597
2,144,761 A * 1/1939 Herold ................... B65G 47/82 198/429
4,171,043 A * 10/1979 Doyle .................... B65G 47/82 198/430
6,189,702 B1 * 2/2001 Bonnet .................. B65G 47/82 198/748
7,207,444 B2 * 4/2007 Heuft ..................... B65G 47/82 209/652
2013/0174519 A1 7/2013 Kershaw et al.

FOREIGN PATENT DOCUMENTS

| | | | | |
|---|---|---|---|---|
| DE | 3916423 C1 | 11/1990 | | |
| GB | 1227774 A | * | 4/1971 | B65G 47/82 |
| JP | S462290 Y1 | | 1/1971 | |
| JP | 62-211218 | * | 9/1987 | B65G 47/82 |
| KR | 200381474 Y1 | | 4/2005 | |
| WO | WO-9915447 A1 | * | 4/1999 | B65G 47/82 |
| WO | WO-2024161435 A1 | * | 8/2024 | B65G 54/02 |

OTHER PUBLICATIONS

Extended European Search Report for European Patent Application No. 25189571.0 dated Dec. 15, 2025. 9 pages.

* cited by examiner

*Primary Examiner* — James R Bidwell
(74) *Attorney, Agent, or Firm* — Lerner David LLP

(57) ABSTRACT

A system includes a housing, a pivotable arm pivotably attached to the housing; a driver coupled to the pivotable arm, a biasing element coupled between the housing and the pivotable arm; a cam rotatably coupled with the driver; a cam follower associated with the cam; and a pusher coupled to the cam follower such that the pusher is configured to translate when the cam is rotated by the driver.

20 Claims, 10 Drawing Sheets

270
250
240a
240b
140
120

COMPACT NON-PNEUMATIC JUSTIFICATION SYSTEM

BACKGROUND

Automated systems for handling various objects may include conveyor systems for transporting the objects from one station to another station. However, the movement of the objects may need to be controlled along the conveyor system.

BRIEF SUMMARY

According to an aspect of this disclosure, a justification system includes a housing, a pivotable arm pivotably attached to the housing, a driver coupled to the pivotable arm, a biasing element coupled between the housing and the pivotable arm, a cam rotatably coupled with the driver, a cam follower associated with the cam, and a pusher coupled to the cam follower such that the pusher is configured to translate when the cam is rotated by the driver.

In one example, the driver has a first longitudinal axis, the pusher has a second longitudinal axis, and the second longitudinal axis is transverse to the first longitudinal axis.

In one example, the cam is configured to rotate about the first longitudinal axis, and the cam follower is configured to translate along the second longitudinal axis when urged by the cam.

In an example, the pivotable arm is pivotably attached to the housing at a first end of the pivotable arm, and the biasing element couples the pivotable arm to the housing at a second end of the pivotable arm.

In an example, the biasing element comprises a first spring on a first side of the driver and a second spring on a second side of the driver.

In an example, the driver is a brushless DC motor.

In one example, the cam and the cam follower are configured to push the pusher along the second longitudinal axis by a first predetermined distance.

In an example, the pivotable arm is configured to pivot away from the housing when the pusher encounters a force exceeding a predetermined threshold. The predetermined threshold is a function of a characteristic of the biasing element.

In an example, the biasing element comprises a spring having a spring constant and the predetermined threshold is a function of the spring constant.

According to another aspect of this disclosure, a system includes a conveyor system including a frame and a moving element, and a justification system secured to the frame. The moving element is configured to move along a third longitudinal axis and convey an object arranged thereon. The justification system includes a driver pivotably coupled to the frame, a cam rotatably coupled with the driver, a cam follower associated with the cam, and a pusher coupled to the cam follower. The pusher is configured to move transverse to the third longitudinal axis.

In an example, the justification system further comprises a housing configured to be secured to the frame.

In an example, the justification system further comprises a biasing element coupled between the housing and the driver.

In an example, the housing comprises a body configured to accommodate the driver.

In one example, the housing further comprises a bracket extending from the housing and configured to be attached to the frame. The bracket extends along the second longitudinal axis.

In an example, the pusher is configured to push an object conveyed by the moving element to a predetermined position on the moving element.

According to an aspect of the disclosure, a method for justifying an object includes moving the object by a moving element of a conveyor system along a first direction, and actuating a driver of a justification system. The driver is oriented along a second direction. The driver causing a pusher of the justification system to push the object about the moving element along a third direction to a predetermined position.

In an example, the actuating the driver further comprises rotating a cam about the second direction.

In an example, the actuating the driver further comprises causing a cam follower associated with the pusher to translate along the third direction.

DETAILED DESCRIPTION

The technology relates generally to a justification system for use in conjunction with a conveyor system. In material handling applications, it is occasionally necessary or desirable to justify an object to a precise position on the conveyor bed for processing. This position may be predetermined. For instance, an inspection of an object moving on the conveyor bed may require the object to be positioned at a predefined position for accurate and complete inspection. In an example, the justification system includes a transverse-mounted cam-actuated system that mediates force with the use of springs.

Figure 1:
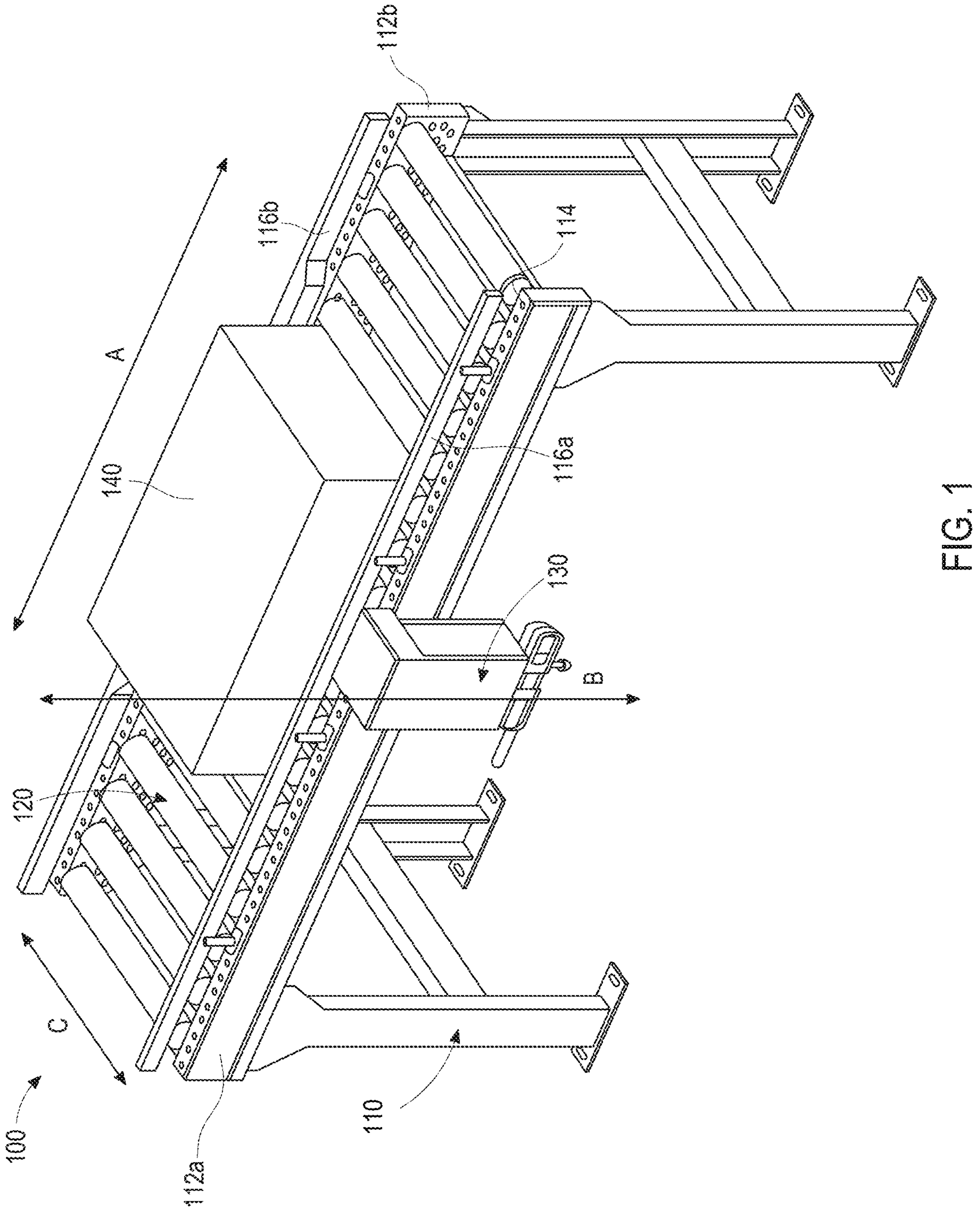
FIG. 1 is a perspective view of a conveyor system with a justification system according to aspects of the disclosure.

FIG. 1 illustrates a system 100. The system 100 includes a conveyor system 110 with a conveyor bed 120 and a justification system 130 mounted to the conveyor system 110. In the illustrated example, the conveyor system 110 includes roller conveyors. In other examples, the conveyor system may include other types of conveyors, by way of non-limiting examples, belt conveyors, slat conveyors, pallet conveyors, ball transfer, or Mat Top conveyors. The conveyor bed 120 extends along a first longitudinal axis shown by a double arrow A. The conveyor system 110 is configured to move an object 140 along the conveyor bed 120 in either of the two directions depicted by the double-arrow A.

The conveyor system 110 includes longitudinal frames 112*a*, 112*b* extending along the conveyor bed 120. The conveyor bed 120 is configured to move relative to the longitudinal frames 112*a*, 112*b*. The longitudinal frames 112*a*, 112*b* include a plurality of apertures, collectively referred to as 114, on the top surfaces thereof for securing attachments such as guide rails 116*a*, 116*b*, in the illustrated example. In other examples, the longitudinal frames 112*a*, 112*b* may, alternatively or in addition, include apertures or other fastening means along the sides or a bottom surface. Although FIG. 1 illustrates two longitudinal frames 112*a*, 112*b*, other embodiments may include fewer or more longitudinal frames.

The justification system 130 is mounted to the conveyor system 110 along a second direction shown by a double arrow B. The justification system 130 can be deployed to justify or otherwise move the object 140 along a third direction shown by a double arrow C on the conveyor bed 120, as will be described in detail below. Thus, the justification system 130 is mounted in the second direction shown by the arrow B, transverse to the third direction of justification of the object 140 shown by the arrow C, instead of along the third direction of justification of the object 140 shown by the arrow C. An advantage of the transverse-mounting is that linear space occupied by the justification system 130 extending from the conveyor bed 120 along the third direction shown by the arrow C is reduced.

While the illustrated example includes one justification system 130 mounted to the conveyor system 110, other examples may include more than one justification systems 130 mounted to a conveyor system. For example, multiple justification systems 130 may be mounted along the longitudinal frame 112*a*. In yet another example, one justification system 130 may be mounted on each of the longitudinal fixed frames 112*a*, 112*b*. Yet another example may include two justification systems mounted across each other on the longitudinal frames 112*a*, 112*b*. In another example, multiple justification systems 130 may be staggered along one or both of longitudinal frames 112*a*, 112*b*.

Figure 2A:
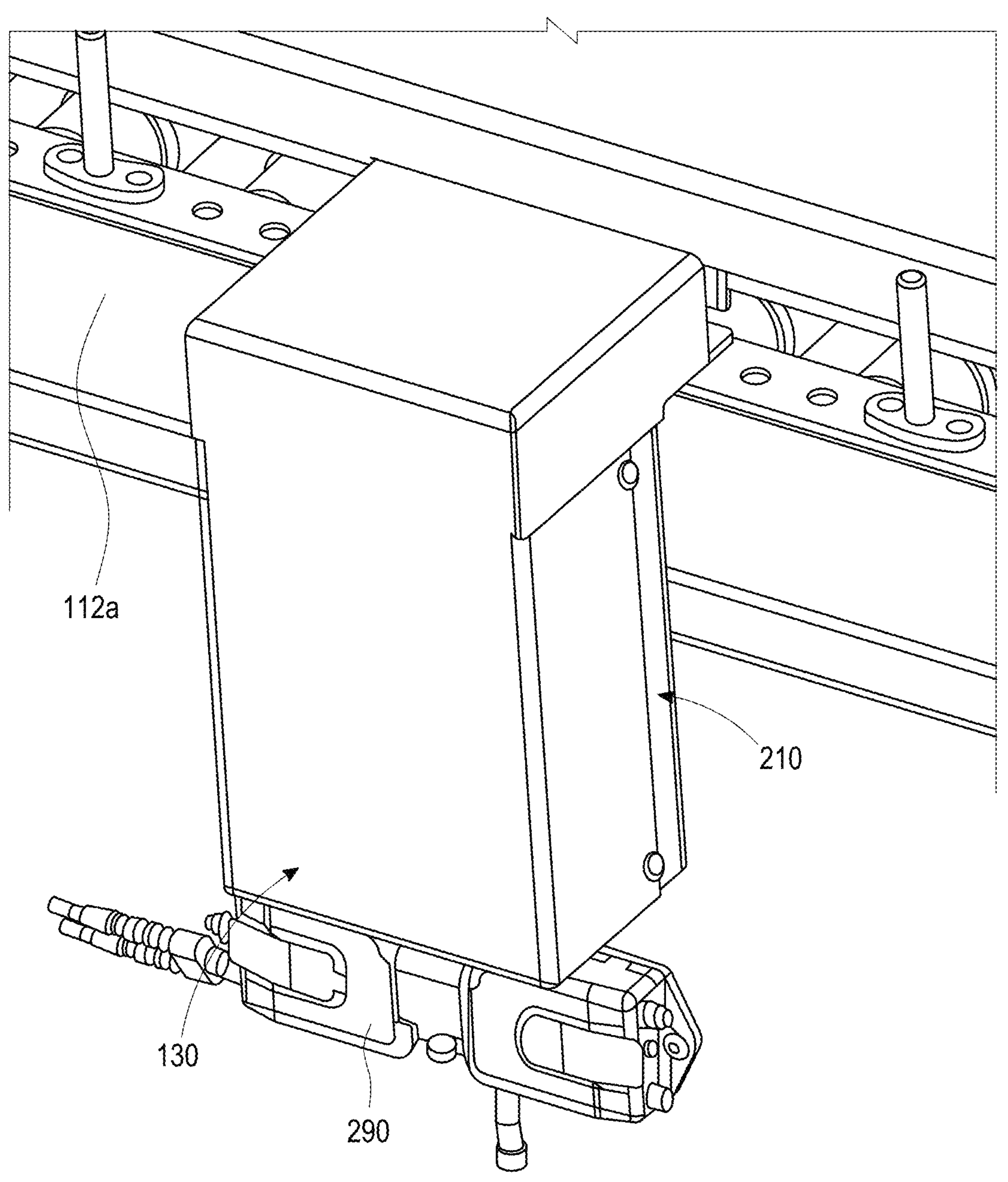
FIG. 2A is a close-up perspective view of the justification system of FIG. 1 according to an aspect of the disclosure.
Figure 2B:
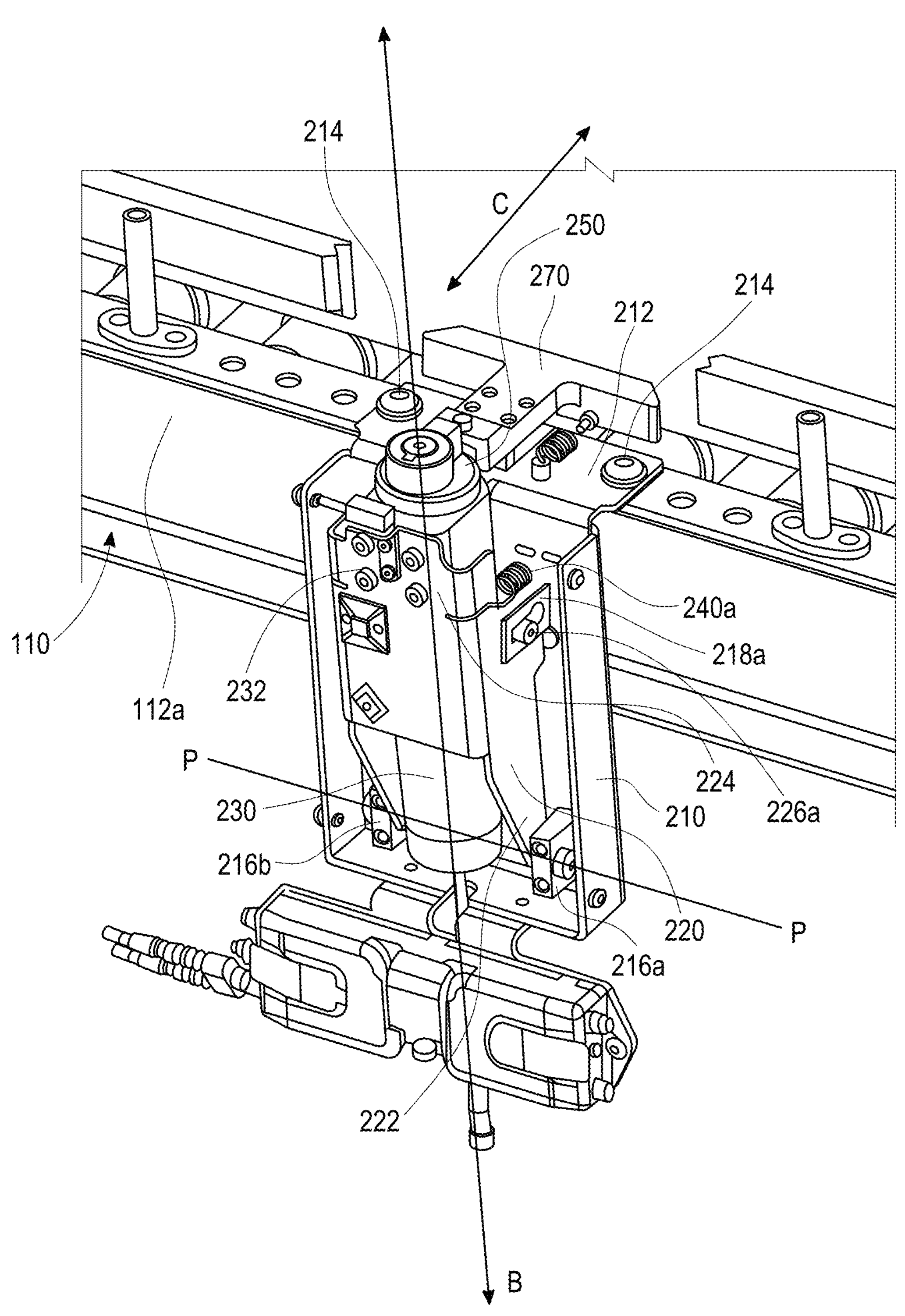
FIG. 2B is an open view of the justification system of FIG. 2A with the cover removed.
Figure 2C:
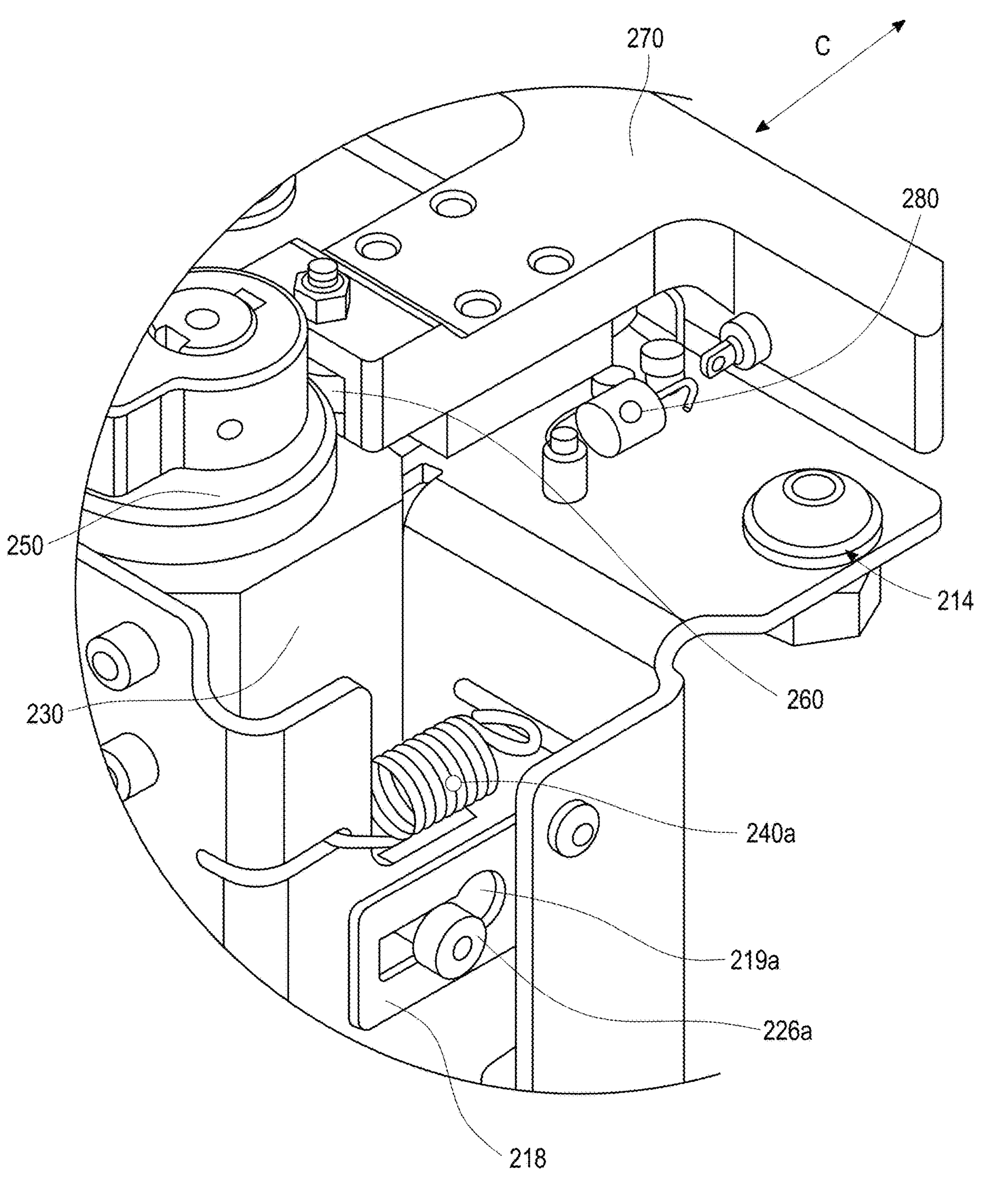
FIG. 2C is a detailed view of the justification system of FIG. 2B.

Referring now to FIGS. 2A-2C, FIG. 2A is a close-up perspective view of the justification system of FIG. 1, FIG. 2B is an open view of the justification system of FIG. 2A with the cover removed, and FIG. 2C is a detailed view of the justification system of FIG. 2B. The justification system 130 includes a housing 210, a pivotable arm 220, a driver 230, a first biasing element 240, a cam 250, a translating cam follower 260, a pusher 270, a second biasing element 280, and a controller 290. The housing 210 includes a bracket 212 for mounting to the longitudinal frame 112*a*. The bracket 212 extends transversely to the housing 210. The housing 210 is mounted to the conveyor system 110 using fasteners 214 and the apertures 114 on the longitudinal frame 112*a* in the illustrated example such that the bracket 212 is generally parallel to the top surface of the longitudinal frame 112*a*. Thus, an advantage of the justification system 130 is that it can be mounted or retrofitted to existing conveyor systems without requiring any structural modifications. The position and the configuration of the bracket 212 can be modified depending on how the housing 212 is attached to the longitudinal frame 112*a*. For example, bracket 212 may extend parallel to the side surface of the longitudinal frame or may extend parallel to the bottom surface of the longitudinal frame 112*a*, depending on the arrangement of the apertures 114 or other fastening means on the longitudinal frame 112*a*.

The pivotable arm 220 has a first end 222 and a second end 224. The first end 222 of the pivotable arm 220 is pivotably connected to brackets 216*a*, 216*b* of the housing 210 in the illustrated example, such that the pivotable arm 220 can pivot about the pivot axis P-P. The second end 224 of the pivotable arm 220 is movably connected to bracket 218 (218*a* in FIG. 2B) of the housing 210 via shoulder bolt 226. While the illustrated example includes one bracket 218*a*, other examples may have two brackets 218.

The bracket 218*a* include an aperture 219*a* to movably receive the shoulder bolt 226. In the illustrated example, the aperture 219*a* is in the form of a keyhole slot. In other examples, the aperture 219*a* may have other shapes such as oval or rectilinear. The length of the aperture 219*a* determines a threshold of the movement of the shoulder bolt 226*a*, and therefore of the second end 224 of the pivotable arm 220, toward and away from the housing 210. As the first end 222 of the pivotable arm 220 pivots about the pivot axis P-P, the second end 224 of the pivotable arm 220 moves away from the housing 210 to the extent permitted by the shoulder bolts 226 within the apertures 219 of the brackets 218. Thus, the bracket 218*a* and the shoulder bolt 226*a* limit the travel of the pivotable arm 220 and may prevent damage to the first biasing elements 240 from over stretching. While the illustrated example includes one shoulder bolt 226*a* and one aperture 219*a*, other examples may include two shoulder bolts 226 and two corresponding apertures 219.

A pair of first biasing elements 240 is connected between the second end 224 and the housing 210 in the illustrated example. In absence of any external force, the pair of first biasing elements 240 tend to pull the second end 224 of the pivoting arm 210 toward the housing. In an example, the first biasing elements 240 include two springs each having a predetermined spring constant. By way of a non-limiting example, the springs may be about 1.5 inches long, have an outer diameter of about 0.5 inch, a spring constant of about 58 lbs/in, with a maximum load of 25 lbs. Other examples of the springs may have different dimensions and different spring constants.

In other examples, the first biasing elements 240 may include gas, rubber, or other types of springs, electric actuators, pneumatic actuators, and weights utilizing gravitational force. One bracket 216*a*, one bracket 218*a*, and one shoulder bolt 226*a*, are illustrated in the exemplary configuration. It will be understood that counterparts of the bracket 216*a*, the bracket 281*a*, and the shoulder bolt 226 may be arranged on the other side of the driver 230 in other examples.

Still referring to FIGS. 2A-2C, the driver 230 is fixedly connected to the second end 224 of the pivotable arm 220 by fasteners 232 in the illustrated example. As a result, when the pivotable arm 220 pivots about the pivot axis P-P, the drive 230 also pivots along with the pivotable arm 220 to and away from the housing 210. In an example, the drive 230 is a brushless DC motor. In other examples, the driver 230 may be a stepper motor, a servo motor, or an AC induction motor. The driver 230 extends along the second longitudinal direction illustrated by the double arrow B in an undeployed state in the illustrated example.

The cam 250 is rotatably coupled to the driver 230. In the illustrated example, the cam 250 is a radial or a disc cam. In other examples, other types of cams may also be used. The translating cam follower 260 is in contact with the cam 250. As the cam 250 rotates, a translating motion is imparted to the cam follower 260. The translating cam follower 260 is fixedly connected to the pusher 270. The pusher 270 extends along and is configured to translate along the direction shown by the double arrow C.

A second biasing element 280 is connected between the pusher 270 and the bracket 212 in the illustrated embodiment. In absence of any external force, the second biasing element 280 pulls the pusher 270 toward the bracket 212. In an example, the second biasing element 280 includes a spring having a predetermined spring constant. In other examples, the second biasing element 280 may include gas, rubber, or other types of springs, electric actuators, pneumatic actuators, and weights utilizing gravitational force. The second biasing element 280 ensures that the translating cam follower 260 remains in contact with the cam 250 and during the rotational motion of the cam 250. While the illustrated example includes one second biasing element 280, other examples may include more than one second biasing elements.

The controller 290 may be configured to be integrated with another controller of the conveyor system 130.

In an example, the justification system 130 may include one or more sensors 275 to detect the position of the pusher 270. In one example, a sensor 275 may be used to detect the retracted position of the cam 250 indicating the pusher 270 is fully retracted and another sensor 275 may be used to detect when the pivoting bracket 224 has pivoted away from the housing 210, indicating that a predefined force set by the biasing elements 240 has been met by the pusher 270 and the object 140 has been justified. In another example, one of the sensors 275 may be configured to detect whether the pusher 270 is in its fully extended position and another sensor 275 may be configured to detect whether the pusher 270 is in its fully retracted position. The one or more sensors 275 may include one or more of ultrasonic sensors, laser sensors, retroreflective sensors, and mechanical limit switches.

Figure 3A:
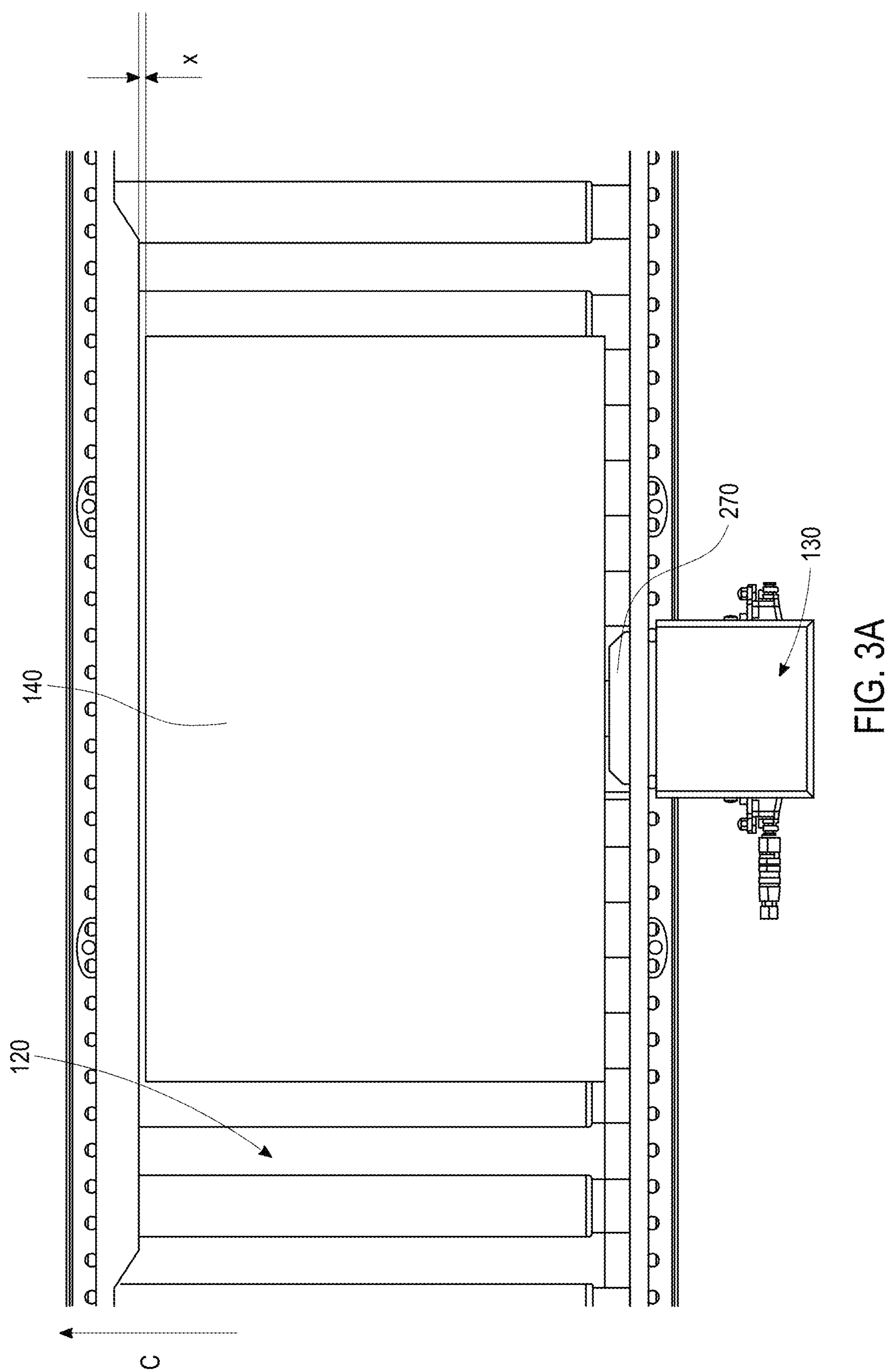
FIG. 3A is a top view of the conveyor system of FIG. 1A.
Figure 3B:
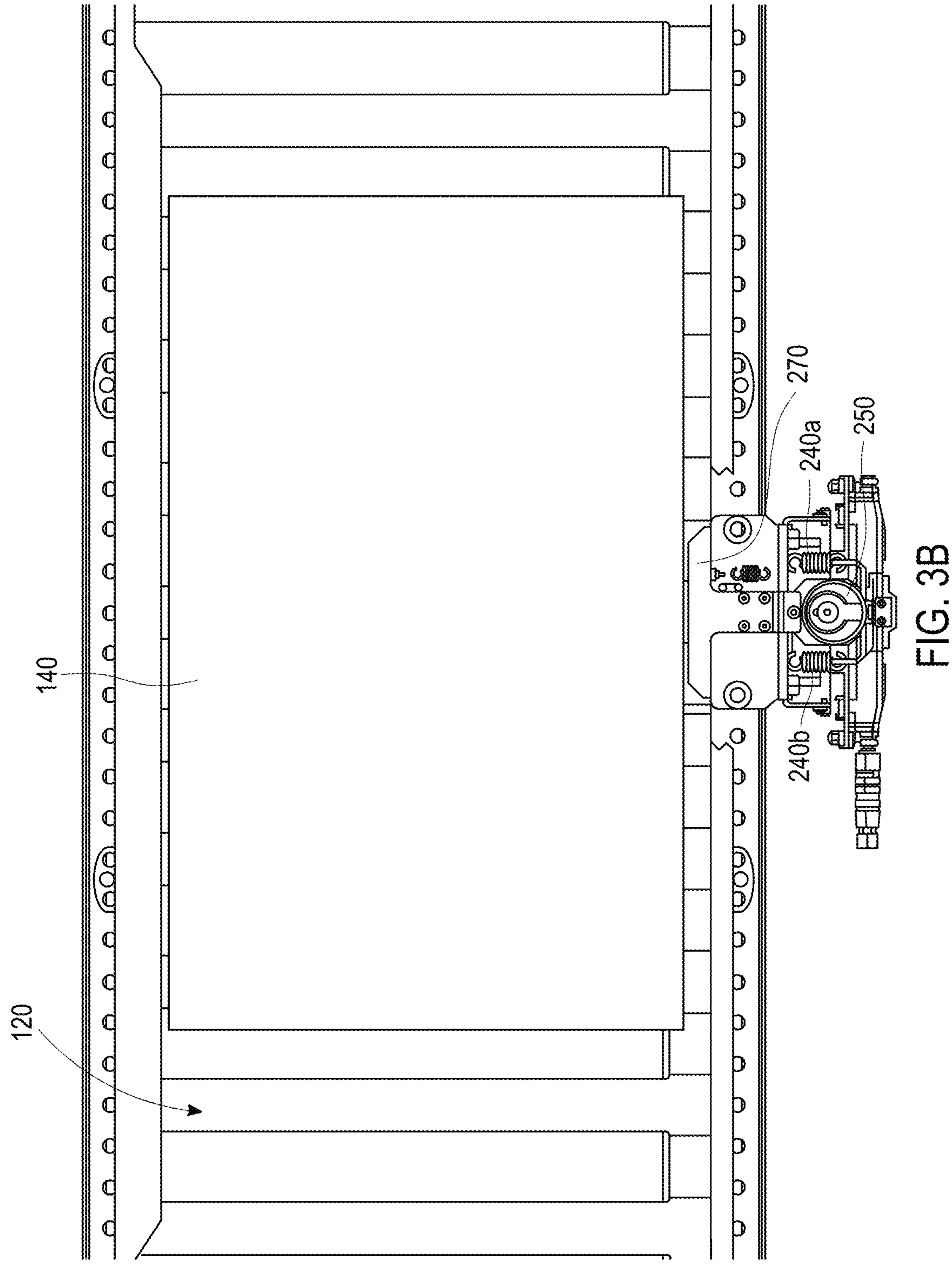
FIG. 3B is a top view of the justification system of FIG. 3A in an initial stage, with the cover of the justification system removed.

Referring now to FIGS. 3A-3E, the operation of the justification system 130 will be described. FIGS. 3A and 3B show the object 140 in an initial position on the conveyor bed 120 prior to being acted upon by the justification system 130. The pusher 270 is not in contact with the object 140. It may be desired that the object 140 be moved by a distance x as shown in FIG. 3A. The pusher 270 can be deployed to move the object 140 by the distance x along the direction shown by the arrow C. In an example, the distance x may be between 1 mm to one inch. FIG. 3B shows the justification system 130 of FIG. 3A with the cover removed. The cam 250 is shown in its initial position.

Figure 3C:
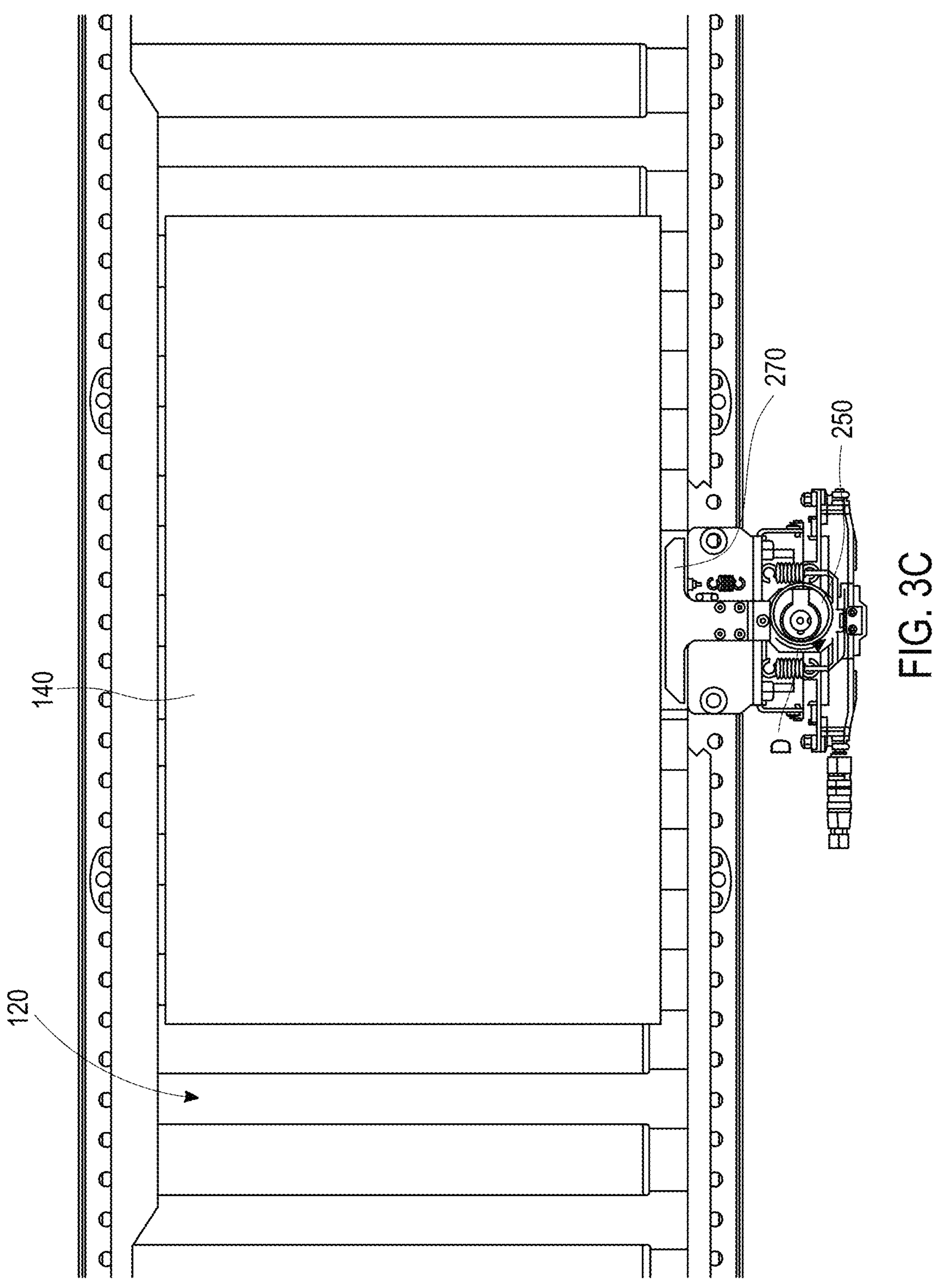
FIG. 3C is the top view of the system of FIG. 3B in an intermediate stage of deployment of the justification system.
Figure 3D:
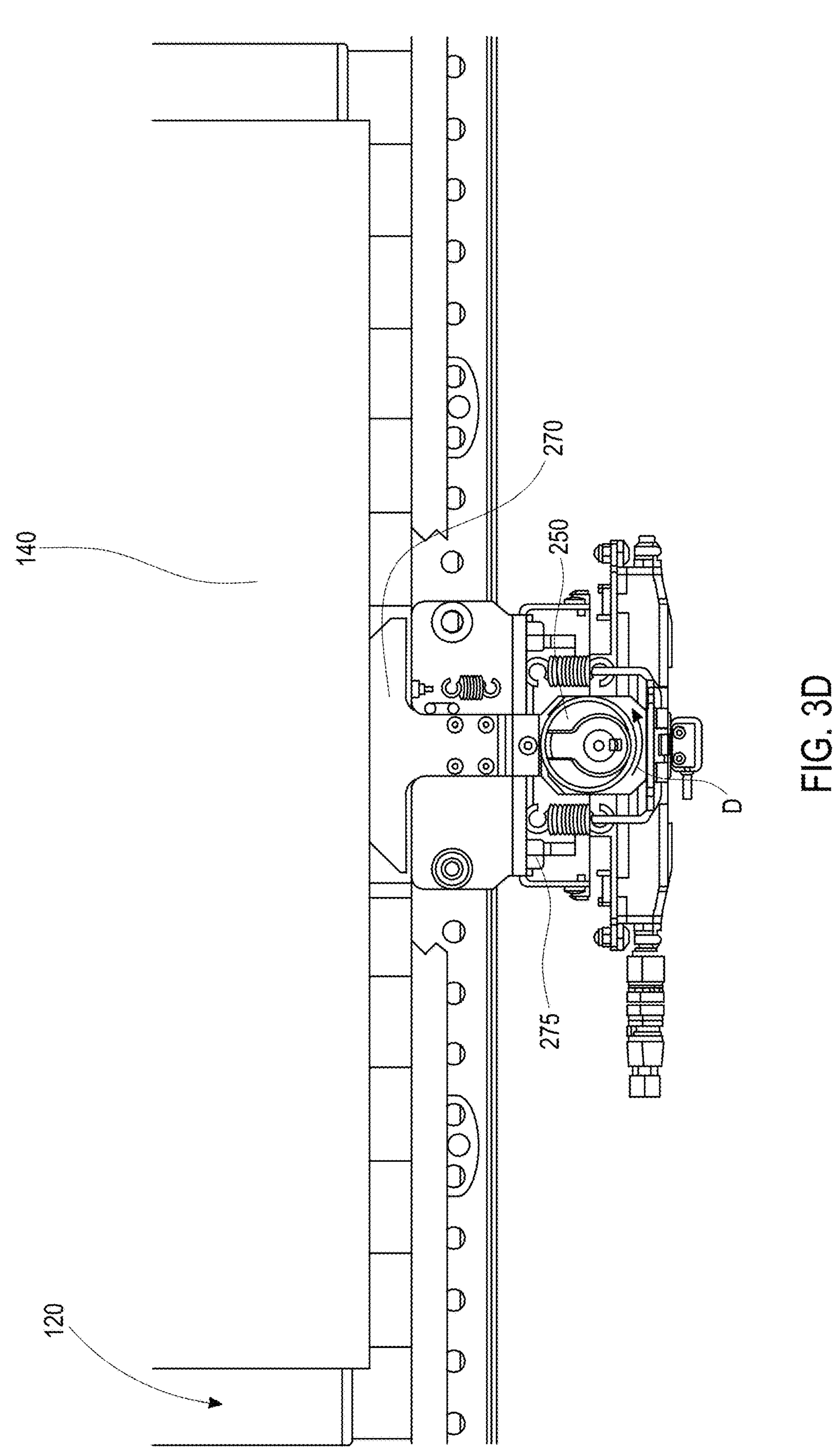
FIG. 3D is the top view of the system of FIG. 3A in a final stage of deployment of the justification system.

FIG. 3C shows the cam 250 rotated, from its initial position shown in FIG. 3B, in an anti-clockwise direction by about 90° by the driver 230. The rotating cam 250 has urged the translating cam 260 and the pusher 270 toward the object 140 such that a contact between the object 140 and the pusher 270 has been initiated. Referring now to FIG. 3D, the cam 250 has been rotated in the anti-clockwise direction, from its initial position shown in FIG. 3B, as shown by the arrow D by about 180° by the driver 230. The pusher 270 starts pushing the object 140 to cover the distance x. The justification system 130 is configured to exert a predetermined amount of force on the object 140 for moving the object 140 along the third direction shown by the arrow C. For instance, the driver 230 may be selected to impart a predetermined amount of torque on the cam 250. A predetermined maximum pushing force may be a function of the spring constant/force of the first biasing elements 240 and their geometrical relation to the cam 250. In an example, the predetermined force is about twenty (20) pounds. In other examples, the justification systems may have different predetermined force.

Figure 3E:
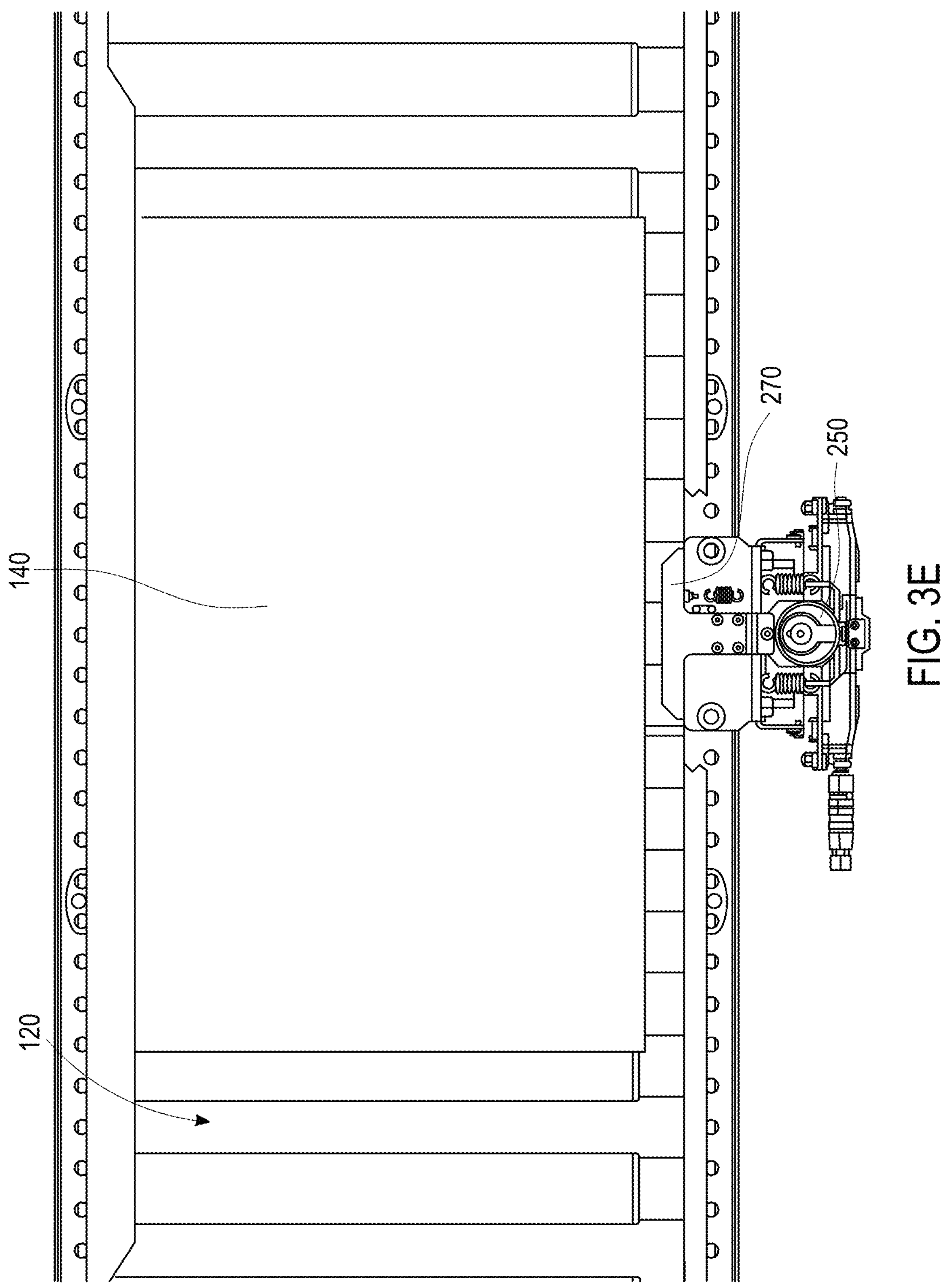
FIG. 3E is the top view of the system of FIG. 3A in a stage of retraction of the justification system.

If the pusher 270 encounters an unexpected resistive force, for example, in case of a jam or an object heavier than the design parameters, the pusher 270 will be pushed back, which in turn will overcome the biasing force of the first biasing elements 240 and cause the pivotable arm 220 along with the driver 230 and the cam 250 to pivot away from the housing 210. Thereby, any damage to the object 140, for example, deformation of the object 140 being justified, and/or the justification system 130, for example, stall current/short circuit in the motor circuit, shearing of fastening bolts on the justification system, or deformation of the cam axle, may be avoided or minimized. FIG. 3E illustrates the object 140 is at the predefined position along the conveyor bed 120. The pusher 270 and the cam 250 have returned to their initial position as shown in FIG. 3B.

Figure 4:
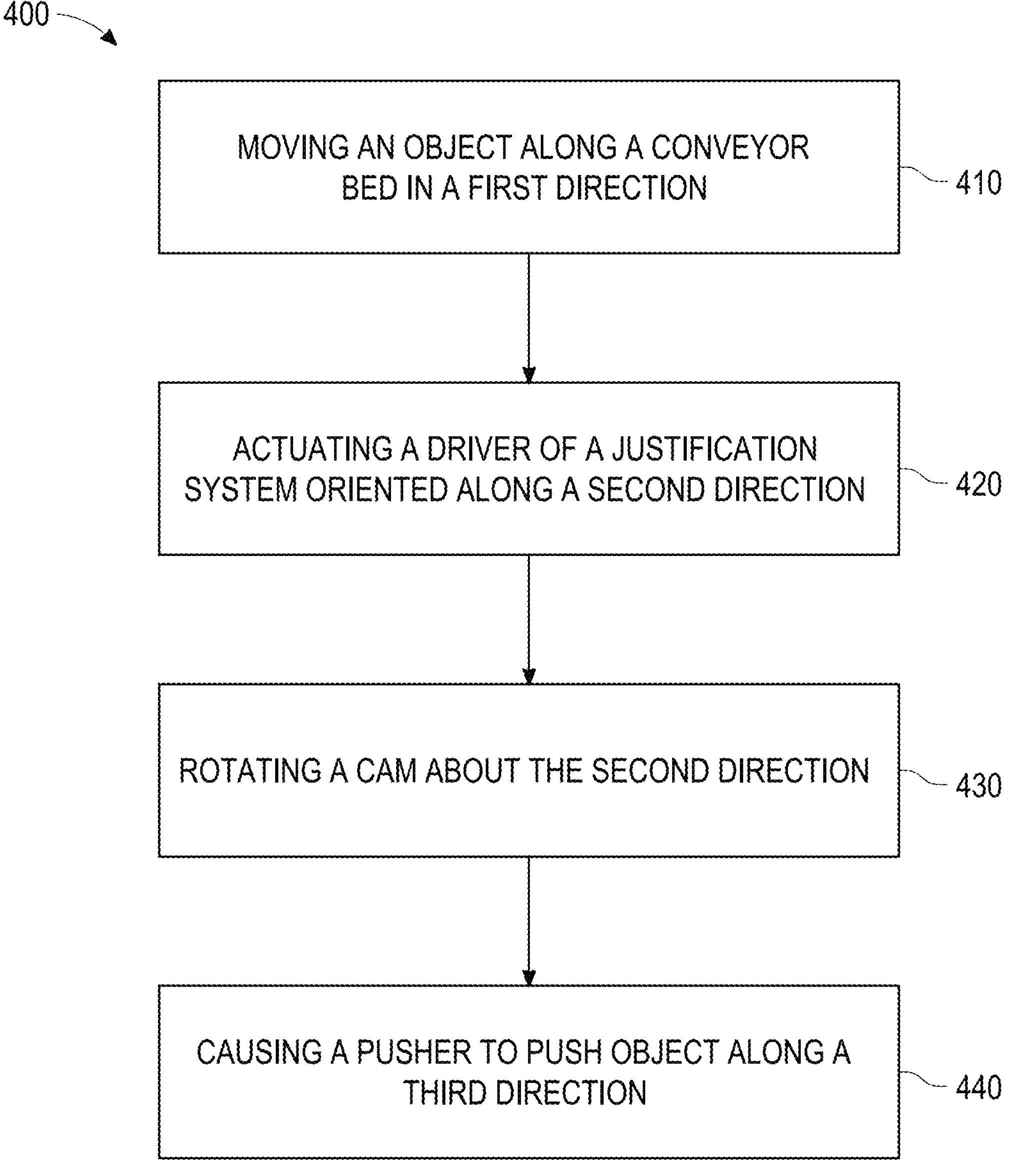
FIG. 4 illustrates a flow chart for a method for justifying an object on a conveyor system using the justification system described herein.

FIG. 4 illustrates a method 400 for justifying an object 140 on a conveyor system 110 using the justification system 130. At 410, the method 400 includes moving the object 140 along the conveyor bed 120 along a first direction shown by the arrow A. At 420, the method 400 includes actuating the driver 230 of the justification system 130 oriented along a second direction along a second direction shown by the arrow B. At 430, the method 400 includes, rotating the cam 250 about the second direction. At 440, the method 400 includes causing the pusher 270, via the translating cam 260, to push the object 140 along a third direction shown by the arrow C.

An advantage of the justification system is that it occupies minimal space perpendicular to the conveyor bed as it is transversely mounted. Another advantage is that the object can be moved over smaller distances with great precision. Yet another advantage is that the force exerted by the pusher may be mediated by the biasing elements such as springs, thereby preventing damage to the system, for example, in case of a jam and providing safety as well in case an operator is manually manipulating the object.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A justification system comprising:
a housing,
a pivotable arm pivotably attached to the housing;
a driver coupled to the pivotable arm,
a biasing element coupled between the housing and the pivotable arm, wherein the biasing element comprises a first spring on a first side of the driver and a second spring on a second side of the driver;
a cam rotatably coupled with the driver;
a cam follower associated with the cam; and a pusher coupled to the cam follower such that the pusher is configured to translate when the cam is rotated by the driver.

2. The justification system according to claim 1, wherein the driver has a first longitudinal axis, wherein the pusher has a second longitudinal axis, and wherein the second longitudinal axis is transverse to the first longitudinal axis.

3. The justification system according to claim 2, wherein the cam is configured to rotate about the first longitudinal axis, and wherein the cam follower is configured to translate along the second longitudinal axis when urged by the cam.

4. The justification system according to claim 1, wherein the pivotable arm is pivotably attached to the housing at a first end of the pivotable arm, and wherein the biasing element couples pivotable arm to the housing at a second end of the pivotable arm.

5. The justification system according to claim 1, wherein the driver is a brushless DC motor.

6. The justification system according to claim 1, wherein the cam and the cam follower are configured to push the pusher along the second longitudinal axis by a first predetermined distance.

7. The justification system according to claim 1, wherein the pivotable arm is configured to pivot away from the housing when the pusher encounters a force exceeding a predetermined threshold.

8. The justification system according to claim 7, wherein the predetermined threshold is a function of a characteristic of the biasing element.

9. The justification system according to claim 8, wherein the biasing element comprises a spring having a spring constant and the predetermined threshold is a function of the spring constant.

10. A system comprising:

a conveyor system including a frame and a moving element, the moving element configured to move along a first longitudinal axis and convey an object arranged thereon; and a justification system secured to the frame, the justification system comprising:

a driver pivotably coupled to the frame;

a cam rotatably coupled with the driver, wherein the cam is oriented in a plane parallel to a plane of the moving element;

a cam follower associated with the cam; and a pusher coupled to the cam follower, wherein the pusher is configured to move transverse to the first longitudinal axis.

11. The system according to claim 10, wherein the cam is arranged above the moving element.

12. The system according to claim 10, wherein the justification system further comprises a housing configured to be secured to the frame.

13. The system according to claim 12, wherein the justification system further comprises a biasing element coupled between the housing and the driver.

14. The system according to claim 12, wherein the housing comprises a body configured to accommodate the driver.

15. The system according to claim 14, wherein the housing further comprises a bracket extending from the housing and configured to be attached to the frame.

16. The system according to claim 15, wherein the bracket extends along a second longitudinal axis.

17. The system according to claim 10, wherein the pusher is configured to push an object conveyed by the moving element to a predetermined position on the moving element.

18. A method for justifying an object, the method comprising:

moving the object by a moving element of a conveyor system along a first direction; and actuating a driver of a justification system, the driver oriented along a second direction, the driver causing a cam to rotate in a plane parallel to a plane of the moving element and the cam causing a pusher of the justification system to move in a plane parallel to the plane of the moving element to push the object about the moving element along a third direction to a predetermined position.

19. The method according to claim 18, wherein the actuating the driver further comprises rotating the cam about the second direction.

20. The method according to claim 19, wherein the actuating the driver further comprises causing a cam follower associated with the pusher to translate along the third direction.

* * * * *